Aug. 19, 1952   J. E. VALENTE ET AL   2,607,494
FILTER ELEMENT
Filed June 16, 1949
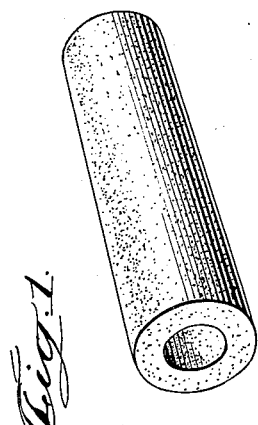
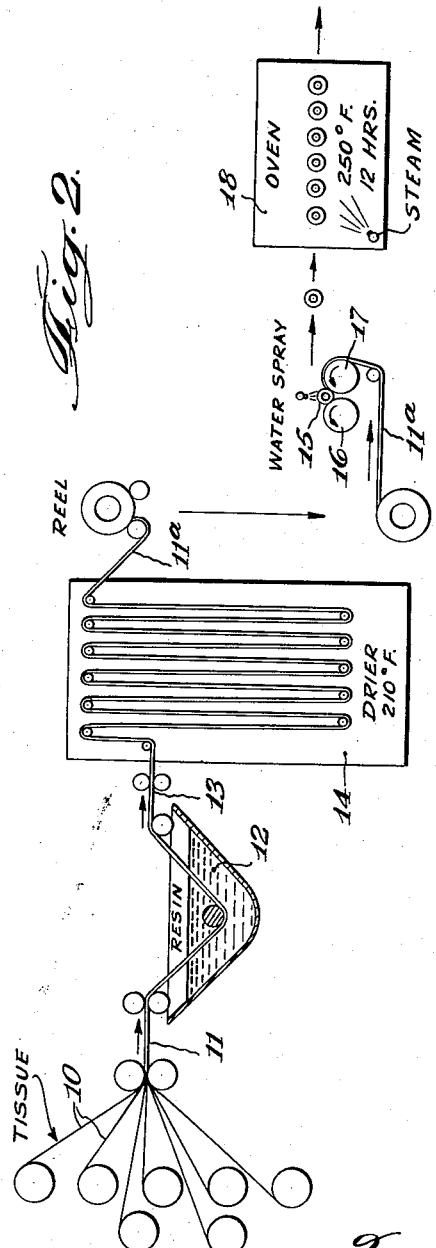
Inventors
John E. Valente
Kenneth R. Wink
By Soans, Pond & Anderson
Attorneys Patented Aug. 19, 1952

2,607,494

UNITED STATES PATENT OFFICE 2,607,494

FILTER ELEMENT

John E. Valente, Neenah, and Kenneth R. Wink, Appleton, Wis., assignors to Paper Patents Company, Neenah, Wis., a corporation of Wisconsin Application June 16, 1949, Serial No. 99,446

3 Claims. (Cl. 210—204)

The present invention relates generally to the manufacture of filter elements, and more particularly, to the manufacture of unitary, replaceable filter elements suitable for the filtering of various fluids, including water and hydrocarbon liquids, such as gasolene, fuel oil, lubricating oil, vegetable oil and animal oil, in either the gaseous or liquid state.

The primary object of the invention is to provide an improved filter element which is self-supporting, or form-sustaining, in the sense that the element is sufficiently rigid, mechanically strong and dimensionally stable that it can be handled and used as a structural unit, without any special precautions to preserve its shape or structure, and without the need of complex associated parts or equipment.

It is also an object of the invention to provide a filter element which, in addition to having high inherent mechanical strength and form stability, shall be capable of operating at a relatively high extraction ratio, so as to produce filtrate of high purity, which shall be capable of extracting contaminating particles of extremely small size, i. e. of the order of from 2 to 5 microns, and which, in addition, shall possess the ability to handle large quantities of liquid at high rates of flow with minimum pressure drop.

In general, filter elements in accordance with the present invention comprise a plurality of superposed sheets of thin, dry-creped, cellulosic tissue of open formation and high bulk characteristics, which are impregnated or otherwise loaded with a bonding material which will not lose its strength during use of the filter, or otherwise be affected by the fluid passing therethrough. Certain synthetic resin materials of the thermosetting type, which will be hereinafter described, are particularly suitable for this purpose. The sheet material is ordinarily manufactured with the bonding resin in the uncured or partially cured condition, and the filter is manufactured by combining a sufficient number of plies of this material to produce a product having a unit density within a specified range, in accordance with methods and procedures which will hereinafter appear. During use, the fluid to be filtered flows through the filter in a direction substantially at right angles to the superposed sheets of tissue. The resin-containing sheet material is conveniently handled in rolls, and if the filter unit is to comprise a tubular element, the unit is made by winding a sufficient number of convolutions about a suitably dimensioned mandrel to provide a convolutely wound tube of the proper wall thickness and density.

Subsequent to the assembly of the sheet material, the resin in the sheets is cured under such conditions that the individual plies constituting the filter unit are permanently bonded together, and in addition, the individual fibers are attached together to provide a strong, mechanically stabilized structure in the filter body. Throughout the processing of the sheet material and the fabrication of the filter unit, great care is exercised to avoid compressing the individual creped sheets. This makes possible a filter structure wherein the constituent plies are bonded together almost exclusively in those regions where the peaks of adjacent crepes come in contact with each other. The over-all result is the provision of a filter element having considerable mechanical strength and rigidity, and having remarkable filtering efficiency, at very high rates of flow. Moreover, because of the stabilized structure of the element, it is operable at continued high efficiency throughout its useful life.

This general method and certain other aspects of the invention are illustrated in the drawings accompanying this application wherein:

Figure 1 is a perspective view of a tubular filter element embodying various of the features of the invention; and Figure 2 is a diagrammatic view illustrating an exemplary process and apparatus suitable for the manufacturing of a filter element such as is illustrated in Figure 1.

The character and type of the cellulosic tissue used is a most important and critical feature of the invention. In general, the most satisfactory results are obtained by the use of thin, dry-creped, cellulosic tissue sheets of the type conventionally designated as wadding. Such sheets are of open formation, have a high bulk factor, and are made from high grade pulps, such as a chemical pulp, or a mixture of pulps containing not less than about 50 to 60% of chemical pulp. Sulphite pulp is particularly suitable for the purposes of the present invention. The sheets should be dry-creped, preferably during manufacture, to provide a finished sheet having a crepe ratio within the range of from about 2.0 to 3.0, and should have a drier basis weight within the range of from about 4.5 to 9.0 lbs. per standard ream of 2880 square feet (480 sheets 24 x 36 inches). It will be understood that the terms "dry-creped" and "drier basis weight" are here used in the technical sense; i. e. a dry-creped sheet is a sheet which has been creped by applying that sheet to a drier (usually a Yankee drier) during its manufacture and removing the sheet from the drier by use of a doctor, and the drier basis weight of a sheet is the weight of a specified square footage of a completely dry, uncreped sheet. The term "crepe ratio" is also used in the technical sense, and defines both the decrease in length and increase in weight of the finished sheet as compared with the raw stock being manufactured on the machine, i. e. if a 6 pound sheet, when creped weighs 12 pounds per ream, that sheet has a crepe ratio of 2.0.

Unless the cellulosic sheet material has a basis weight and crepe ratio within the ranges stated, and unless the sheet material has been dry-creped, great difficulty will be encountered in the provision of a satisfactory filter element in accordance with the present invention. For reasons not entirely understood by applicants, single ply cellulosic sheets, creped or uncreped, which have a basis weight in excess of about 10 lbs. per standard ream, and which are of sufficiently uniform formation and structure to permit their use in filters, offer great resistance to the flow therethrough of fluids of all types, i. e. both liquids and gases. In fact, this resistance is so great that the use of such sheets in the construction of filters of the type wherein the material to be filtered passes successively through a plurality of plies of the filter in a direction which is generally at right angles to the surface of the sheet material constituting that filter, is not satisfactory. However, a plurality of dry-creped sheets of lower basis weight, as above defined, involving the same actual weight of fiber, will give equal filtering efficiency at very greatly increased flow rates. In other words, for a given amount of cellulose fiber and for a given volume of the filter, a filter made from dry-creped tissue of less than 10 lbs. basis weight will operate at as good or better efficiency than a filter made from sheets which are of more than 10 lbs. basis weight, and in addition, the filter made from the lower basis weight sheets will have much higher flow rates for a given pressure drop than the filter made from the heavier weight sheets.

Considering certain specific examples, three plies of a 10 lb. basis weight tissue were placed in a filter test unit. Using air as the fluid passing through the filter, it was observed that a volume of air equal to 2 cu. feet per minute could be passed through the three plies of tissue with a pressure drop across the filter of approximately 3.5 mm. of water. A three ply, dry-creped tissue having a basis weight of 7.74 lbs. per ream, and a crepe ratio of 2.4 (i. e. a weight per standard ream, as used, of approximately 18.6 lbs.) produced a flow rate of 20.4 cu. feet per minute at a pressure drop of 3.5 mm. In other words, the flow rate for the same pressure drop was oven ten times as great, and this despite the fact that the higher flow rate was produced with a considerably greater weight of cellulose— 56 pounds versus 30 pounds per ream. In another test, a three ply test sample of a 10 lb. tissue produced a flow rate of 4.5 cu. feet of air per minute, with a pressure drop across the filter of 10 mm. of water. In contrast, three plies of a 4.75 lb. basis weight dry-creped sheet having a crepe ratio of 2.45 (i. e. a weight per standard ream for the creped sheet of 11.63 lbs.) produced a flow rate of 4.5 cu. feet per minute with a pressure drop of .10 mm. of water, and three plies of a 5.90 lb. basis weight sheet having a crepe ratio of 3.0 (a creped sheet weight of 17.7 lbs.) produced a flow rate of 4.5 cu. feet per minute with a pressure drop of .35 mm. of water.

In all instances, the efficiency of the filters made from the lighter basis weight, dry-creped tissue, as measured by extraction ratio and minimum size of particles removed, was as good as, or better than, the filters made from the heavier weight tissue. Also, when sheets of materially heavier weight than 10 lbs. are used, the effectiveness and usefulness of the filter will decrease at a rapidly increasing rate, due to the sharp decrease in flow rate.

Thus, the critical value at which the important increase in flow rate occurs appears to be just under the 10 lb. basis weight figure, and the beneficial effect begins to increase at a very rapid rate when the basis weight drops to about 8.5 to 9.0 lbs. per standard ream. In this region, there is also a physical change in the dry-creped tissue which is readily observable by the use of a microscope. This physical change is believed to be induced at least in part by the dry creping operation, and it is probable that this change is at least partially responsibe for the remarkable increase in filtering efficiency which results from the use of dry-creped tissue having a basis weight under about 9.0 lbs. per ream.

As previously pointed out, filter elements in accordance with the present invention comprise a plurality of superposed sheets or thicknesses of tissue, which are disposed, during use of the filter, substantially at right angles to the normal direction of flow of material through the filter. There should be at least about 240 sheets of tissue per linear inch of filter material, measured in the direction of fluid flow, and there is little advantage in going above 320 sheets per inch, although when a sheet of very low basis weight is used, a somewhat increased number of plies may be advantageously employed.

The amount of bonding material present is such that the individual sheets and the individual fibers are bonded to each other, as previously described. It is important, however, that the bonding material shall not be present in amounts sufficient to extend into the interstices between the tissue sheets and the fibers. When these conditions are satisfied, there will be provided a very large number of connecting pockets or passageways between the various sheet plies and the constituent fibers, which not only serve to filter out the material which is to be eliminated from the filtrate, but in addition, provide regions for the retention or storage of such materials.

Filter elements in accordance with the invention can be manufactured by the use of single-ply tissue sheets, but it is preferred, in the interests of manufacturing economy, to assemble a plurality of the tissue sheets into a continuous, multi-ply web. This multi-ply web can be handled before and after the addition of the binding material to much better advantage, on account of its greater physical strength, and it also adapts itself to production of the finished filter element in a much shorter time.

In some instances, the addition of the bonding material to the completed filter element can be effected after the fabrication of that element. However, it will generally be found more practical to introduce the bonding material into the cellulosic sheets before the sheet material is assembled into the filter unit.

As previously indicated, the most satisfactory bonding materials which have been found for use in the manufacture of filters in accordance with the present are synthetic resins and especially thermosetting, synthetic resins. The bonding material should be capable of being distributed throughout the cellulosic sheet material or throughout the body of the filter element, when dissolved, suspended or otherwise dispersed in a liquid vehicle, and the bonding material must not lose its strength or otherwise be affected by the passage through the fiber of the fluid being filtered. Various thermosetting resins which can be reatced to the "C" stage, i. e. the stage of substantial insolubility in organic or other solvents, will be found to meet both of these requirements. In addition, thermosetting resins are generally capable of withstanding considerable heat, which is of great advantage when handling heated fluids such as lubricating oil. The bonding agent used should also be capable of being incorporated into the base sheet material and there reacted, without the use of substantial pressure.

Various resins of the phenol-aldehyde type, the resorcinol-aldehyde type, the urea-aldehyde type and the melamine aldehyde type are particularly suitable for this purpose, as are certain of the unsaturated polyester resins, the contact pressure resins, which are the reaction products of unsaturated polybasic acids with saturated or unsaturated polyhydric alcohols and the reaction products of saturated polybasic acids with unsaturated polyhydric alcohols. The water soluble types are generally preferred from the viewpoint of economy, although resins soluble only in non-aqueous solutions, such as alcohol, acetone, xylol or other organic solvents can be used to advantage. Particularly, resins soluble in alcohol or other organic solvents produce a somewhat more uniform cellular structure in the filter, and there is less loss of wet strength in the sheet during the introduction therein of the resin bonding material.

Regardless of whether a plurality of individual plies of the creped tissue are first assembled into continuous multi-ply webs or whether a single ply web is being used, it will usually be found most convenient to effect distribution of the synthetic resin bonding material throughout the cellulosic tissue by an impregnation operation. During this operation, it is important to take special precautions in order to prevent breakage of the web and especially to minimize compressing of the web. These precautions are particularly necessary because of the inherent frangibility and mechanical weakness of cellulosic sheet tissues within the useful range of basis weights, which characteristics are accentuated when the web is wet during the impregnation or other procedure followed for distributing the bonding agent therein. Following the incorporation of the resin bonding material into the single or multi-ply web, the web is dried to reduce the volatile content thereof to a value within the range of from about 8 to 15 percent of the weight of the web leaving the drier, this value being determined by placing a sample of the dried web in an oven at 300° F. for 10 minutes. The described reduction in the volatile content will effect partial cure of the named thermosetting resins (to but not beyond the "B" stage).

As previously indicated, the various fabrication and resin distribution operations should be conducted in such manner that the corrugations or crepes in the individual tissue plies are substantially preserved in the completed filter product, i. e. the sheets should not be compressed to any substantial degree during the manufacture of the filter unit. This may require that the tissue material be completely supported during the impregnating and drying operations, although this is not always necessary, particularly when a substantial number of tissue plies are combined prior to the distributing of the bonding agent therein.

When the bonding agent is a synthetic resin of the types described above, the amount of bonding agent may be as low as about 20% of the weight of the finished filter element, on a bone dry basis, although it will ordinarily be found desirable to provide bonding material in an amount equal to about 50% of the weight of the finished element. The use of synthetic resin bonding agent in excess of about 70% of the weight of the filter element, when dry, is not recommended. The optimum and preferred range is from 50 to 70%.

There are two important objectives to be accomplished by the bonding agent. These are the joining together of the individual fibers in the separate plies of the material, and also the joining together of the plies into a rigid, mechanically-strong and dimensionally-stable structure. In loading and joining together the fibers, the resin also prevents damage to the filter structure by the passage therethrough of the material to be filtered.

In connection with the use of thermosetting resins as bonding agents, it has been observed that there is a substantial increase in the bulk of resin-containing, cellulosic sheets, as above defined, during the curing of the resin. This increase in bulk, which carries through into the finished filter product, is an unexpected and very unusual result. Generally, resins shrink in volume and resin-containing fibrous material decreases in bulk when the resin is cured. This increase in bulk is of great value in opening the interstices within the filter body, and materially improves the final product.

The specific gravity of filter units manufactured by the use of synthetic resin-bearing fibrous sheet products in accordance with the present invention is a convenient index of whether or not the product has been properly handled during the manufacture of the filter. Depending upon the basis weight of the constituent sheets, and the amount of resin bonding material used, the specific gravity of the completed filter product should be within the range of from .15 to .45. Units constructed at specific gravities lower than the figure given will be found to lack mechanical strength and to be otherwise unsatisfactory. Specific gravities exceeding the upper limit above stated will indicate compression or other densification of the constituent sheet material during manufacture, and the resultant filter will not be satisfactory.

*Specific example*

In the manufacture of a tubular filter element, such as is illustrated in Figure 1, which element was particularly adapted for filtering the fuel oil supplied to diesel engines, the base sheet material constituted a dry-creped, cellulosic tissue made wholly from a sulphite pulp furnish. The sheet material had a drier basis weight of about 6 lbs. per ream of 2880 square feet (480 sheets 24 x 36 inches), and a crepe ratio of approximately 2.5. From about 5 to 10 of the individual tissue sheets, as illustrated at 10 in Figure 2, were combined to form a single, multi-ply web 11. The number of plies to be used depended on the manufacturing conditions and requirements.

The multi-ply web was impregnated with resinous bonding material by passing the web through an aqueous solution 12 of a water soluble, phenol-formaldehyde, thermosetting resin of a type capable of being reacted to the "C" stage at a temperature of 250° F. in about 1-2 hours, in other words, a slow-setting resin. Surplus resin was removed by passing the web through a pair of metering or squeeze rolls 13, which engage the web with very light pressure. The web 11 was next passed through a drier 14 of the festoon, or other suitable type, where it was subjected to temperatures of approximately 210° F. for about 20 minutes. This effected partial cure of the resin and reduced the volatiles in the web to about 10% of the total weight of the web leaving the drier. The resin content of the solution 12 was such that after the volatiles in the multi-ply sheet had been reduced to approximately 10%, the resin content of the web was about 60% of the weight of the web. Throughout the impregnating, the partial curing and the drying operations, great care was exercised to minimize compressing of the web or of the creping in the individual constituent plies.

As previously indicated, it is desired, in the practice of the present invention, to maintain the crepe and bulk of the constituent sheets without material change throughout the impregnating and filter-forming operations. This makes possible the joining together of the individual plies at the regions where the peaks of the adjacent crepes touch, and greatly improves the cellular structure of the filter. The dried, multi-ply web 11a leaving the drier 14, is strengthened structurally by the partially cured resin contained therein, and is in condition to be reeled into a suitable roll for storage or it may be converted at once into filters of a tubular, plate or other type. In the manufacture of a tubular filter, such as is illustrated in Figure 1, the filter tube is conveniently formed by winding the dried, multi-ply web 11a onto a suitable core or mandrel. Conveniently, the mandrel is tubular so as to reduce its weight per linear inch to about 1 lb., this arrangement preventing compressing of the multi-ply web when it is rolled thereon. In the particular example illustrated, a core or mandrel 15 which may have a diameter of 1⅜ inches was laid in the crotch between a pair of positively driven rolls 16 and 17 running in the same direction and at approximately the same speed as the web 11a, it being understood that the web throughout its travel through the equipment, may be propelled by a suitable supporting belt, or other means, not shown.

The end of the web 11a was attached to the surface of the mandrel 15 by means of a local application of a small amount of water or other solvent used in the impregnating bath and was rotated by reason of its gravity contact with the two revolving rolls 16 and 17. Thus the web 11 will be wrapped around the core or mandrel 15. When the wrap or winding reached the required thickness, the web was severed, and the winding with its core removed. To obtain a tube wall thickness of ⅜ of an inch, it required about 13 to 17 convolutions of a 7-ply web, so that the tube wall thus included about 90 to 120 plies or convolutions of the single tissue sheet.

While the web is being wound around such a core, or is otherwise being shaped into the form of the desired filter unit, it is often desirable to spray water upon the surface of the web. When used, enough water is sprayed on the web so that when the winding or shaping is complete, the water represents about 50% of the weight of the unit, exclusive of the weight of the mandrel or core. Steam may also be used for this purpose.

The mandrels 15 with their windings thereon are heated in an oven 18 for from one to eight hours at a temperature of 250° F., the time and temperature depending upon conditions such as type of resin, heat transfer, wall thickness, etc. During the drying operation, a small amount of live steam from the heating coils, which may contain saturated steam at about 100 lbs. per sq. inch, may be admitted to the oven.

The heating of the mandrel windings in the oven for the time and temperatures stated served to advance the cure of the resin to the "C" stage, and at the same time, effected bonding together of the fibers in the individual tissue plies, and also the bonding together of the separate plies. After cooling and removal of the core, there remained a rigid, self-supporting tubular element of considerable mechanical strength, having a characteristic cellular structure. The element had a wall thickness in the described example of ⅜ inch and a specific gravity within the range of from about .25 to .35.

A battery of filter tubes constructed according to the aforesaid specifications, when used for filtering No. 1 diesel fuel oil at a temperature of 70° F., gave a flow rate of 6.25 gal. per minute per square foot of external tube surface, the flow being inward toward the center of the tube, and being in a direction generally at right angles to the surface of the superposed tissue sheets. A very high extraction ratio accompanied by the removal of particles down to a size of about 2 microns was accomplished at the flow rate stated, with a pressure drop of about 10 lbs. across the filter.

The multi-ply sheet material described in the foregoing may be fabricated into other types of filter units adapted for other filtering purposes. For example, extended area filters may be manufactured by the provision of accordion pleated or other suitably shaped tubes, the walls of which comprise multi-ply cellulosic sheet material in accordance with the invention. Also plate and sheet type filter units can be readily fabricated from the sheet material described.

In the foregoing, we have disclosed the features of an improved, self-supporting, porous, low-density filter element which is capable of operating at a high extraction ratio, of removing contaminating particles of very small dimension from the fluid with minimum loss of pressure. The structural features of the filter element have been accurately and positively defined, and the preferred manufacturing procedures have been described in detail.

Various of the features of the invention believed to be new are set forth in the accompanying claims.

This application is a continuation-in-part of our prior application Serial No. 601,874, which was filed on June 27, 1945, now abandoned, and which is assigned to the assignee of this invention.

We claim:

1. A filter element of the class described comprising a low-density, fluid permeable, self-supporting filter wall which is adapted to be interposed in the path of flow of a fluid material which is to be filtered, said filter wall comprising a plurality of superposed sheets of thin, dry-creped, cellulosic tissue, disposed substantially at right angles to the normal direction of flow through said filter element, said sheets having a basis weight within the range of from about 4.5 to 9.0 lbs. per ream 2880 sq. feet, and a crepe ratio, when manufactured, of from about 2.0 to 3.0, the individual fibers constituting said sheet and said sheets being bonded together by a thermo-set, synthetic resin bonding material which is present in sufficient amounts to unite said fibers and said plies into an integral, self-supporting structure, wherein the separate plies contact each other almost exclusively in the regions where the peaks of adjacent crepes come together, the interstices between the fibers and said plies being substantially free of resin and said filter wall having a specific gravity within the range of from about .15 to .45.

2. A filter element of the class described comprising a low-density, fluid permeable, self-supporting filter wall which is adapted to be interposed in the path of flow of a fluid material which is to be filtered, said filter wall comprising a plurality of superposed sheets of thin, dry-creped, cellulosic tissue, disposed substantially at right angles to the normal direction of flow through said filter element, said sheets having a basis weight within the range of from about 4.5 to 9.0 lbs. per ream 2880 sq. ft., and a crepe ratio, when manufactured, of from about 2.0 to 3.0, the individual fibers constituting said sheet and said sheets being bonded together by a synthetic resin bonding material which is present in an amount equal to from about 20 to 70% of the weight of said filter wall, said filter wall having a specific gravity within the range of from about .15 to .45, and there being at least about 240 of the bonded-together sheets per inch of thickness of said filter wall.

3. A filter element of the class described, comprising a porous, low density, self-supporting, tubular filter member which is adapted to be interposed in the path of flow of liquid material to be filtered, said tubular member comprising a plurality of superposed sheets of thin, dry-creped, cellulosic tissue, which extend circumferentially around a longitudinal axis to form the walls of said tubular member and which are bonded together by a thermo-set resin bonding material which substantially impregnates the constituent cellulosic fibers of said sheets, said sheets having a basis weight within the range of from about 4.5 to 9.0 pounds per ream of 2880 square feet and a crepe ratio, when manufactured, of from about 2.0 to 3.0, said thermo-set resin bonding material being present in said bonded together sheets in an amount which is equal to from about 50 to 70% of the weight of said filter member, said filter member having a specific gravity within the range of from about .15 to .45 and there being from about 240 to 320 plies per inch of thickness of said filter member.

JOHN E. VALENTE.
KENNETH R. WINK.

REFERENCES CITED

The following references are of record in the file of this patent:

UNITED STATES PATENTS

| Number | Name | Date |
| --- | --- | --- |
| 754,053 | Derham | Mar. 8, 1904 |
| 817,253 | Kneuper | Apr. 10, 1906 |
| 1,673,239 | Groff | June 12, 1928 |
| 1,829,886 | Yates | Nov. 3, 1931 |
| 2,017,200 | Beck | Oct. 15, 1935 |
| 2,039,312 | Goldman | May 5, 1936 |
| 2,095,131 | Headson | Oct. 5, 1937 |
| 2,196,821 | Arnold | Apr. 9, 1940 |
| 2,292,513 | Fourness et al. | Aug. 11, 1942 |
| 2,354,395 | Mason | July 25, 1944 |
| 2,386,684 | Hermanson | Oct. 9, 1945 |